Patented Apr. 17, 1945

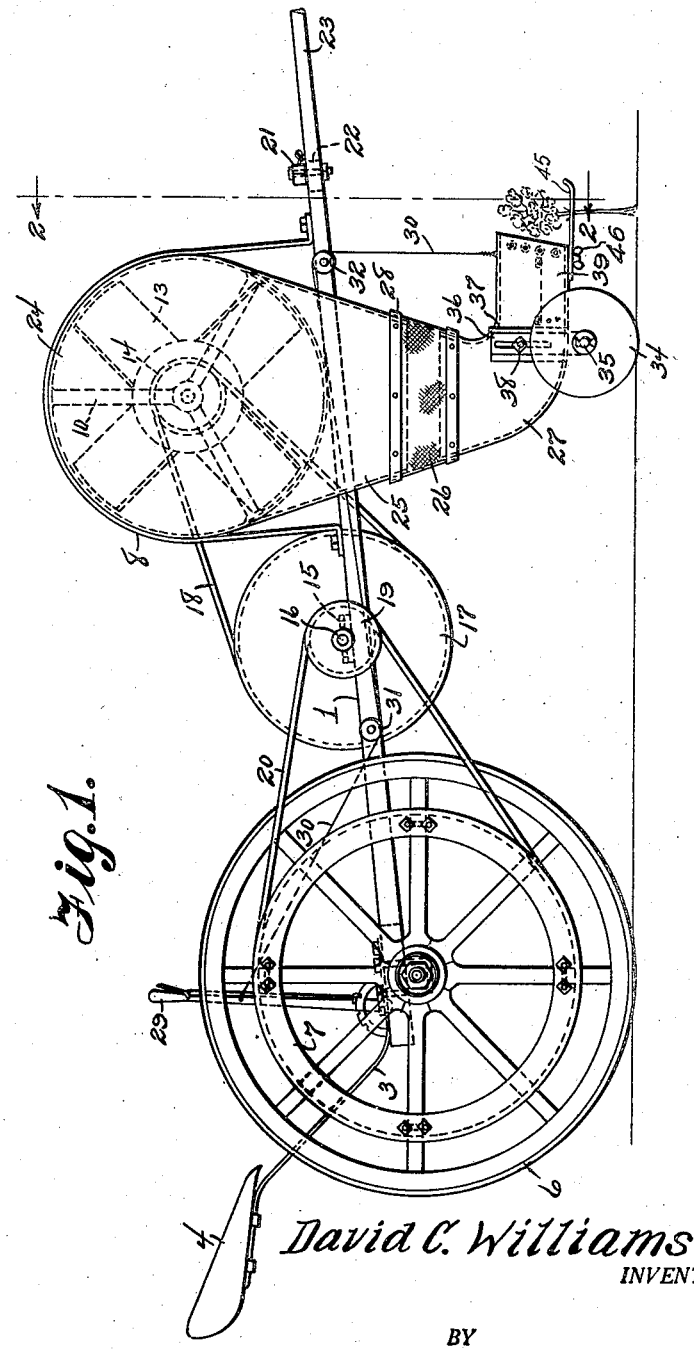

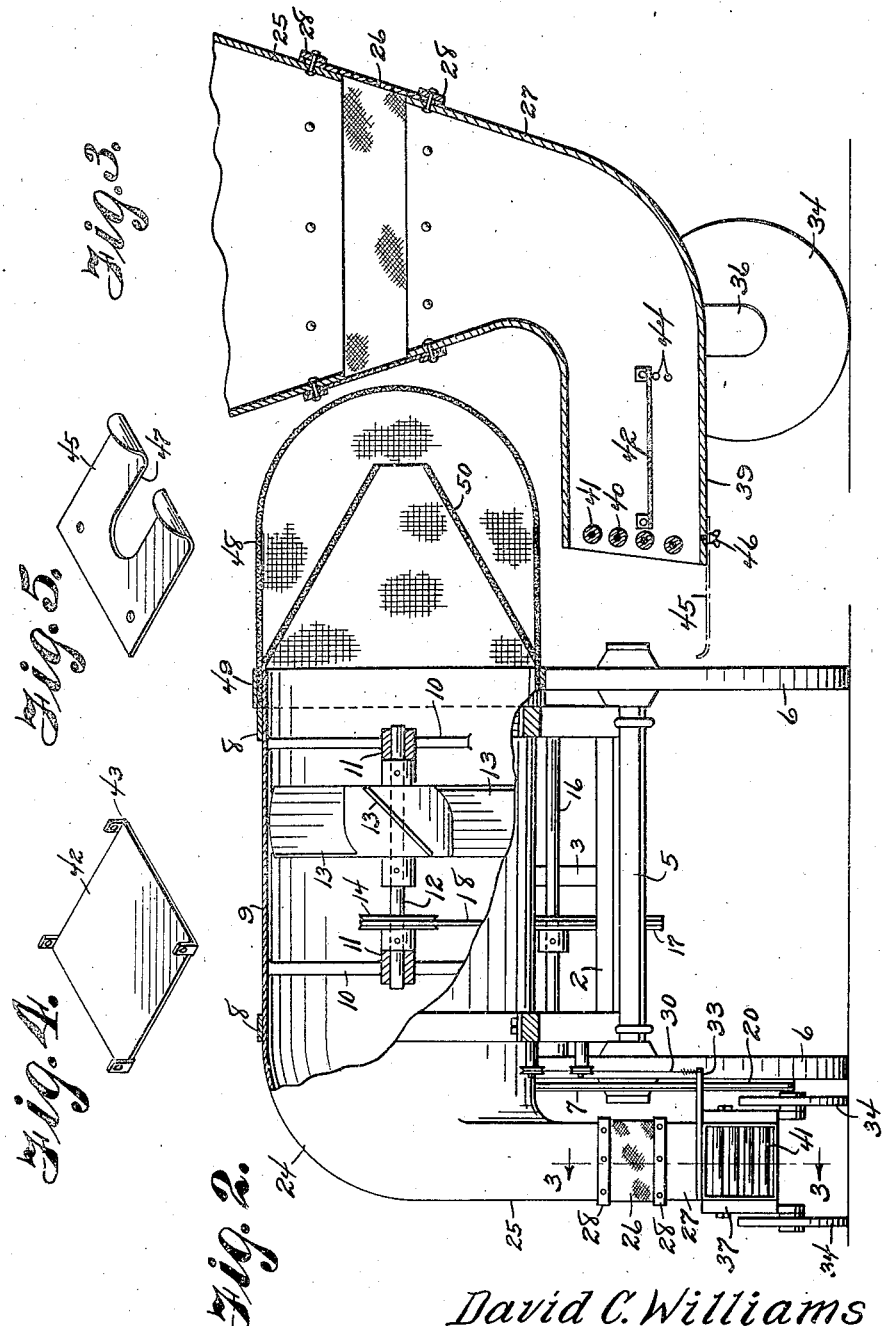

2,374,150

UNITED STATES PATENT OFFICE 2,374,150

INSECT CATCHING MACHINE

David C. Williams, Waynesboro, Ga.

Application April 18, 1942, Serial No. 439,593

5 Claims. (Cl. 43—140)

This invention relates to insect catching machines, and its general object is to provide a wheeled machine that is primarily designed for gathering insects from growing plants, particularly boll weevils from cotton, and for depositing the insects within a container, wherein they are confined to be subsequently destroyed.

A further object is to provide an insect catching machine of the pneumatic type, that is adapted to travel along rows of growing plants, and will remove insects therefrom without injury to the plants, in that the machine includes a suction conduit having a flexibly mounted inlet section provided with an intake having spaced rollers bridging the same to contact the plants, thus preventing the latter from being sucked or being drawn within the conduit, and the inlet section is supported by adjustable ground engaging wheels to vary the height thereof, in accordance with the height of the plants.

Another object is to provide an insect catching machine that is simple in construction, inexpensive to manufacture, and extremely efficient in operation, use and service.

This invention also consists in certain other features of construction and in the combination and arrangement of the several parts, to be hereinafter fully described, illustrated in the accompanying drawings and specifically pointed out in the appended claims.

In describing the invention in detail, reference will be had to the accompanying drawings wherein like characters denote like or corresponding parts throughout the several views, and in which:

Figure 1 is a side elevation of the machine which forms the subject matter of the present invention.

Figure 2 is a sectional view taken approximately on line 2—2 of Figure 1, looking in the direction of the arrows, and illustrates parts broken away and in elevation.

Figure 3 is a sectional view taken approximately on line 3—3 of Figure 2, looking in the direction of the arrows.

Figure 4 is a perspective view of the baffle plate to control the suction or force of air currents drawn into the inlet.

Figure 5 is a perspective view of the guard plate to prevent passage of debris into the suction conduit, as well as to guide plants toward the inlet and in contact with the rollers thereof.

Referring to the drawings in detail, it will be noted that my machine includes an elongated supporting frame that is made up of a pair of spaced parallel side members 1 and a cross member 2, the latter being secured to and bridging the rear ends of the side members, as shown in Figure 2. Fixed to and rising centrally from the cross member at a rearward and upward inclination, is a spring supporting member 3 for an operator's seat 4. An axle 5 is secured to and bridges the rear end portions of the side members and has ground engaging wheels 6 journaled thereon, the wheels including spokes in the form shown and fixed to the outer sides of the spokes of one of said wheels is a ring pulley member 7 of a diameter slightly less than that of the wheel.

Secured upon the side members 1 in crossed relation thereto, by clamping bands 8 and arranged a considerable distance in advance of the ground engaging wheels, is a horizontally arranged cylindrical casing 9 that provides a suction chamber, in that it has a pair of spaced spiders 10 fixed therein, provided with registering hubs 11 having a shaft 12 rotatably mounted therein and extending along the longitudinal center of the chamber, as best shown in Figure 2, the shaft having fixed thereto a suction fan 13 and a pulley 14.

Mounted in bearings 15 secured to the side members 1, rearwardly of the casing, is a shaft 16 that bridges the side members and has fixed thereto between the side members, a relatively large pulley 17. The pulleys 14 and 17 are of the grooved type and have trained about the same, a V-type belt 18 that passes through openings in the casing. A small pulley 19 is fixed to one end of the shaft 16 for disposal in alignment with the ring pulley 7 and the pulleys 19 and 7 are likewise of the grooved type and have a V-type belt 20 trained about the same, with the result it will be seen that the fan is indirectly driven by the pulley carried ground engaging wheel, in the form shown. The machine can also be drawn by a draft animal, and for that purpose, I have shown a whippletree 21 pivoted to a cross member 22 secured to the side members 1 in advance of the casing, and the portions of the side members forwardly from the whippletree provide shafts 23 for the animal, such as a horse to be hitched to the whippletree as will be apparent.

One end of the casing extends a considerable distance laterally of the frame, and that end is closed by a rounded wall 24 that has formed on and depending therefrom the upper section 25 of a suction conduit that also includes a flexible intermediate section 26 and a lower rigid inlet section 27. The vertical portion of the conduit is tapered inwardly from its juncture with the end wall, as shown in Figure 1, and the lower section is in the form of an elbow with its horizontal portion directed forwardly. The flexible section is made from fabric or the like, such as canvas and is fixed to the confronting ends of the upper and lower sections by attaching bands 28. By flexibly mounting the inlet section, it is freely movable vertically as well as will give in all directions, and is normally suspended for disposal in proximity to the ground, to ride over the plants in brushing relation therewith, as indicated in Figure 1. However, the inlet section can be elevated when making a turn at the end of a row, and for that purpose I provide a conventional hand lever 29 suitably mounted adjacent the operator's seat and having one end of a cable 30 connected thereto, the cable being trained about pulleys 31 and 32, mounted on and disposed laterally of a side member 1, and the opposite end of the cable is connected to an arm 33 secured to and extending laterally and inwardly from the top wall of the inlet section, as shown in Figure 2.

The inlet section is also supported by ground engaging wheels 34 journaled on stub shafts 35 that are fixed to the lower ends of longitudinally slotted attaching bars 36 mounted for slidable movement between spaced guides 37 secured to the side walls of the inlet section and the bars are held in adjusted position by bolt and nut connections 38. By that construction, it will be obvious that the inlet section can be supported at various heights relative to the ground, and consequently in accordance with the height of the plants.

The horizontal portion 39 of the inlet section is preferably square in outline, as shown, and the outer or intake end thereof is inclined downwardly from its top. Secured to and bridging the side walls of the horizontal portion 39 adjacent to the outer end thereof is a row of horizontally disposed rods 40 having mounted thereon rollers 41 spaced an ample distance apart to allow for the free passage of the insects drawn from the plants, within the conduit, but preventing the plants from being drawn therein, thus eliminating injury to the plants, as will be apparent.

Mounted within the horizontal portion 39 is a baffle plate 42 of a width to extend completely across the same, and the plate has upright apertured ears 43 formed thereon at its corners, for receiving suitable fastening means that extend through holes in the side walls of the horizontal portion, for securing the plate in place. The plate is adjustable for disposal at various angles in a vertical plane, and for that purpose there is provided an arcuate row of rear holes 44 for receiving the rear fastening means, as will be apparent from Figure 3. By providing the adjustable baffle plate, it will be obvious that the force of the incoming air can be controlled, and such is important to prevent injury to the plants.

A guard plate 45, as best shown in Figure 5 is provided for the intake end of the inlet section, and is secured to the under face of the horizontal portion 39 by wing bolts 46, to extend in advance thereof, so as to prevent passage of debris within the conduit, and the guard plate is centrally recessed as at 47 to receive and direct the plants in contact with the rollers 41. The outer ends of the plates are curved upwardly, so as to also prevent injury to the plants.

The end of the casing opposite to the conduit is open and detachably secured thereto is a container 48 of wire mesh, for receiving the insects, the container extending horizontally from the casing and its inner end is secured to the casing by a clamping band 49, while the outer end of the container is rounded in semispherical formation. Removably mounted within the container is a substantially conical partition 50, which is likewise made from wire mesh, and has its apex end open and directed toward the closed end of the container, it being obvious that the partition acts as a trap to prevent the insects from escaping from the container, when the fan is inactive.

From the above description and disclosure in the drawings, it will be obvious that the machine is drawn along a row of plants, with the intake end of the conduit directed in alignment with the row, for said end to ride over the plants in brushing relation therewith. Such action tends to loosen the insects which are drawn into the conduit to be deposited within the container, by the air currents provided by the fan. When the container becomes filled, it is removed and the insects are destroyed in any suitable manner.

It is thought from the foregoing description that the advantages and novel features of the invention will be readily apparent.

It is to be understood that changes may be made in the construction and in the combination and arrangement of the several parts, provided that such changes fall within the scope of the appended claims.

What I claim is:

1. An insect catching machine for travel along rows of plants for gathering insects therefrom, comprising a wheeled supporting frame, a cylindrical casing secured to said frame, a conduit depending from one end of the casing for disposal laterally of the frame, an intermediate flexible section included in the conduit, a rigid lower inlet section secured to the intermediate section and including a horizontal portion directed toward the front of the machine, a row of horizontally disposed spaced rollers bridging the intake of the lower section, ground engaging wheels supporting the lower section and adjustably carried thereby, a suction fan within the casing for drawing insects from the plants, a wire mesh container secured to the opposite end of the casing for receiving the insects therefrom, and means mounted in the container for trapping the insects therein.

2. An insect catching machine for travel along rows of plants for gathering insects therefrom, comprising a wheeled supporting frame, a casing secured to said frame, a conduit formed on and depending from the casing and provided with a horizontally disposed lower inlet portion directed toward the front of the machine, rollers bridging the intake of the lower section, a suction fan in the casing for drawing insects from the plants, means for driving the fan, a baffle plate within said horizontal portion and being adapted to control the force of air drawn therein, a guard plate secured to and extending forwardly of the intake, said guard plate being recessed to provide a passage for the plants and having upwardly curved outer ends, and a container removably secured to the casing for receiving the insects therefrom.

3. An insect catching machine for travel along rows of plants for gathering insects therefrom, comprising a wheeled supporting frame including spaced parallel side members, a cylindrical casing secured to and bridging said side members and having a closed end, a conduit formed on and depending from the closed end and being tapered inwardly toward its lower end, a flexible intermediate section included in the conduit, a rigid lower inlet section secured to the intermediate section and being in the form of an elbow with the lower portion thereof arranged horizontally and directed toward the front of the machine for disposal in brushing engagement with the plants, rollers bridging the intake of the lower section, ground engaging wheels adjustably secured to the lower section for supporting the same, an operator's seat secured to the frame, means for elevating the lower section and including a lever disposed adjacent to the operator's seat, a suction fan in the casing for drawing insects from the plants, means for driving the fan, and a container secured to the casing for receiving the insects therefrom.

4. In an insect catching machine, a wheeled supporting frame, a cylindrical casing mounted on the frame transversely of its path of movement, a wire mesh end member attached to and enclosing one end of the casing, a conical trap member mounted within the said wire mesh member, a depending conduit connected to the opposite open end of the casing and having a diminishing taper downwardly from the casing, a flexible conduit section secured to and extending downwardly from the conduit, an elbow shaped inlet section having an upwardly directed portion secured to the lower end of the flexible section and having a horizontal section directed forwardly with relation to the frame, a pair of support rollers adjustably connected with the said elbow section, a rotary suction fan mounted transversely in the intermediate portion of the casing and operative to draw insects inwardly through the end conduit thereof and to blow the same in to the wire mesh end portion, and means on the supporting frame for rotating the said fan.

5. In an insect catching machine, a support frame, a casing mounted horizontally on the frame having a trap at one end and a depending suction conduit at the opposite end, a horizontally disposed inlet conduit having a forwardly directed opening mounted at the bottom of said suction conduit, a plurality of horizontally arranged rollers mounted within the opening, said rollers being disposed transversely of the inlet and at vertically spaced intervals therein, a baffle plate mounted in an essentially horizontal position in the inlet intermediate the top and bottom thereof and adjustable to incline the same to regulate the intake, and a rotary suction fan mounted in the casing.

DAVID C. WILLIAMS.